United States Patent
Garner et al.

(10) Patent No.: US 6,859,596 B2
(45) Date of Patent: Feb. 22, 2005

(54) SYSTEMS AND METHODS FOR FORMING ULTRA-LOW PMD OPTICAL FIBER USING AMPLITUDE AND FREQUENCY KEYED FIBER SPIN FUNCTIONS

(75) Inventors: Harry Douglas Garner, Lawrenceville, GA (US); Zhi Zhou, Lawrenceville, GA (US); Jinkee Kim, Norcross, GA (US); Alan H. McCurdy, Duluth, GA (US)

(73) Assignee: Fitel USA Corp., Norcross, GA (US)

( * ) Notice: Subject to any disclaimer, the term of this patent is extended or adjusted under 35 U.S.C. 154(b) by 221 days.

(21) Appl. No.: 10/202,540

(22) Filed: Jul. 23, 2002

(65) Prior Publication Data

US 2004/0017986 A1 Jan. 29, 2004

(51) Int. Cl.[7] ................................. G02B 6/02
(52) U.S. Cl. ................ 385/123; 385/124; 65/402; 65/438; 65/504
(58) Field of Search ................ 385/123–128; 65/402, 438, 504; 57/293, 335

(56) References Cited

U.S. PATENT DOCUMENTS

| | | |
|---|---|---|
| 5,298,047 A | 3/1994 | Hart, Jr. et al. |
| 5,826,419 A | 10/1998 | Shelander et al. |
| 6,240,748 B1 | 6/2001 | Henderson et al. |
| 6,550,281 B1 * | 4/2003 | Hawk ........................ 65/402 |
| 2003/0152348 A1 * | 8/2003 | Chen et al. ................. 385/123 |
| 2004/0069018 A1 * | 4/2004 | Oh et al. ..................... 65/402 |

OTHER PUBLICATIONS

Franco Cocchini, A. Mazzotti, A. Ricco, and A, Rossi; *On–Line Fiber Spinning Monitoring for Low PMD Optical Fibers*; Proceedings of the 49th International Wire and Cable Symposium, Atlantic City, N.J., Nov. 13–16, 2000.

* cited by examiner

*Primary Examiner*—Hemang Sanghavi
(74) *Attorney, Agent, or Firm*—Alston & Bird LLP

(57) ABSTRACT

A system and method is disclosed for manufacturing single mode optical fiber which incorporates a spin in the molten fiber during manufacturing. The introduction of spin minimizes a form of distortion called polarization mode dispersion (PMD) and varying the spin, i.e. changing its characteristics, is known to further reduce PMD. However, introducing spin on a molten fiber may result in also introducing twist on the fiber. Twist is a non-permanent rotational force on the cooled fiber which causes stress and is to be avoided. A spin function is disclosed that not only contains a high degree of variability for reducing PMD, but also ensures that mechanical twist on the fiber is minimized, thus reducing stress on the fiber. The spin function modulates either the amplitude, frequency, or both, at the beginning of a cycle to minimize twist on the fiber.

16 Claims, 7 Drawing Sheets

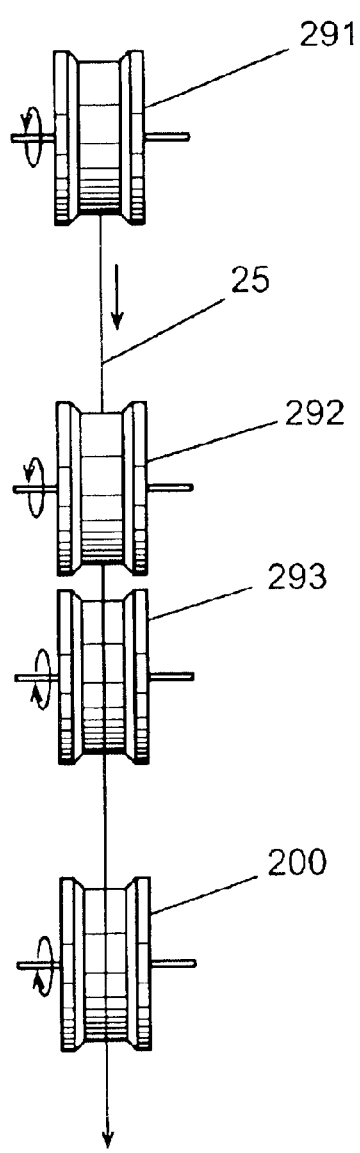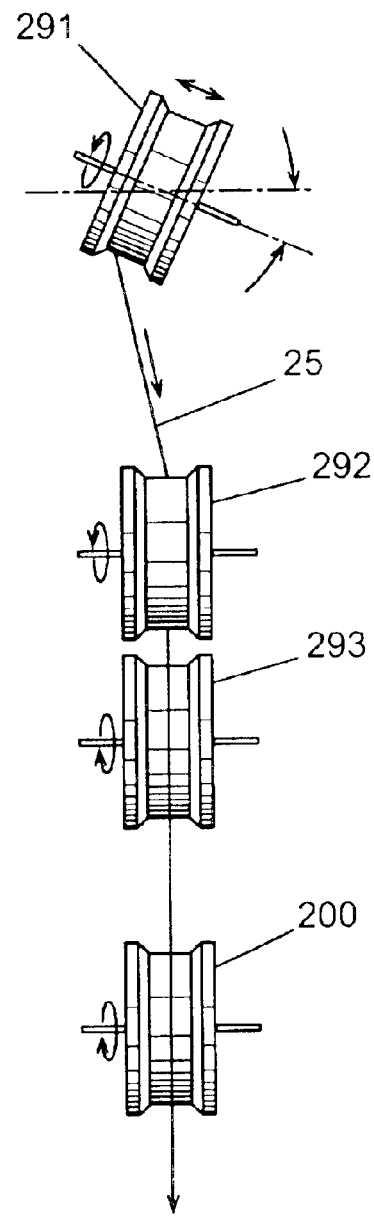
(Prior Art)
Fig. 2A
(Prior Art)
Fig. 2B

SYSTEMS AND METHODS FOR FORMING ULTRA-LOW PMD OPTICAL FIBER USING AMPLITUDE AND FREQUENCY KEYED FIBER SPIN FUNCTIONS

BACKGROUND

This invention relates to systems and methods of manufacturing single mode optical fiber. More particularly, it relates to defining spin functions for reducing PMD over a broad band of fiber birefringence while minimizing twist introduced on the optical fiber. This application is being filed concurrently with application Ser. No. 10/202,560, entitled System And Method For Obtaining Spin And Mechanical Twist Data During Optical Fiber Draw, which is incorporated by reference into this application.

It is well known that the so-called "single mode fiber" that is commonly used in communication systems is not purely single mode. Rather, two modes, with perpendicular polarizations, exist in single mode fiber. See, for example, Dandliker, R., Anisotropic and Nonlinear Optical Waveguides, C. G. Someda and G. Stegeman (editors), Elsevier, N.Y., 39–76, 1992. Mathematically, these two polarizations form an orthogonal basis set. Accordingly, any configuration of light that propagates through a single mode fiber can be represented by a linear superposition of these two modes.

If the fiber is perfectly circularly symmetric in both geometry and internal and applied stress, the two polarization modes are degenerate. The modes would propagate with the same group velocity and have no time delay difference after traveling the same distance in the fiber. However, a typical optical fiber is not perfectly circularly symmetric. Imperfections, such as geometric and form deformation and stress asymmetry, break the degeneracy of the two modes. See, for example, Rashleigh, S. C., Journal of Lightwave Technology, LT-1:312–331, 1983. As a result, the two polarization modes propagate with different propagation constants ($\beta_1$ and $\beta_2$). The difference between the propagation constants is termed birefringence ($\Delta\beta$) and is expressed as:

$$\Delta\beta = \beta_1 - \beta_2$$

Birefringence causes the polarization state of light propagating in the fiber to evolve periodically along the length of the fiber. The distance required for the polarization to return to its original state is the fiber beat length ($L_b$), which is inversely proportional to the fiber birefringence. In particular, the beat length $L_b$ is given by:

$$L_b = 2\pi/\Delta\beta$$

Accordingly, fibers with more birefringence have shorter beat lengths and vice versa. Typical beat lengths observed in practice range from as short as 2–3 millimeters (a high birefringence fiber) to as long as 10–50 meters (a low birefringence fiber).

In addition to causing periodic changes in the polarization state of light traveling in a fiber, the presence of birefringence means that the two polarization modes travel at different group velocities; the difference increasing as the birefringence increases. The differential time delay between the two polarization modes is called polarization mode dispersion, or PMD. PMD causes signal distortion that is very harmful for high bit rate systems and analog communication systems.

Various methods to reduce PMD have been disclosed. One prior art method of reducing PMD involves spinning the preform (the pure glass form which the fiber is formed), during the fiber drawing process. See, for example, Barlow, et al., Applied Optics, 20:2962–2968, 1981; Payne, et al., IEEE Journal of Quantum Electronics, QE-18:477–487, 1982; Rashleigh, "Fabrication of Circularly Birefringent Single Mode Fibers," Navy Technical Disclosure Bulletin 5:7–12, 1980; and PCT Patent Publication No. WO 83/00232. Spinning causes the internal geometric and/or stress asymmetries of the fiber to rotate about the fiber's axis as one progresses down that axis. By performing the spinning during drawing, i.e., when the root of the preform is substantially molten, essentially pure rotation is performed on the fiber asymmetries, as opposed to a combination of rotation of the asymmetries and the introduction of rotational stress as would occur if the fiber were twisted after having been drawn. For a discussion of the use of spin to reduce PMD see, for example, Schuh et al., Electronics Letters, 31:1172–1173, 1995; and Ulrich, et al., Applied Optics, 18:2241–2251, 1979.

Another method of reducing PMD is disclosed in U.S. Pat. No. 5,298,047 to Arthur C. Hart, Jr. et al., (hereafter "Hart"), which discusses reducing PMD by a relatively low rate spinning of a fiber, as opposed to a preform, during the drawing process. (See also U.S. Pat. No. 5,418,881). More particularly, the Hart patent discloses a spin function which varies in a substantially sinusoidal manner. That is, Hart's spin rate $\alpha$ as a function of distance z along the length of Hart's fiber can be written as:

$$\alpha(z) = \alpha_0 \sin(2\pi f z)$$

where $\alpha_0$ is Hart's spin amplitude in turns/meter and $f$ is Hart's longitudinal frequency in inverse meters, i.e., $f$ represents the rate at which Hart's spin rate $\alpha$ varies along the length of the fiber.

The term "spin function" as used herein describes the spin rate as a function of distance z, i.e., $\alpha(z)$, or as a function of time t, i.e., $\alpha(t)$. The time spin function applied to a fiber is directly derivable from the corresponding distance spin function through the fiber draw rate (and vice versa). The draw rate is normally constant in the general case, but can be variable. As discussed more fully below, the spin function employed in producing a fiber, whether expressed as a function of distance or expressed as a function of time, and the resulting spin function present in the finished fiber, are not generally identical. One reason for the difference is because of mechanical effects in the equipment handling the fiber, e.g., slippage at the interface between the fiber and the apparatus used to apply the spin function to the fiber and/or preform.

U.S. Pat. No. 5,943,466 to Henderson (hereinafter "Henderson") discloses improved spin functions that are: (1) not substantially constant, i.e., they change substantially as a function of distance along the length of a fiber or as a function of time; (2) not substantially sinusoidal; and (3) have sufficient variability, e.g., sufficient harmonic content, to provide a substantial reduction in PMD for a plurality of beat lengths.

Henderson discloses a variety of non-uniform spin functions. For example, a spin function can be constructed as a weighted sum of sinusoidal components of different frequencies with the number of components and their weights being chosen to produce an overall function that achieves the PMD reductions of the invention. The spin function can also be randomly generated. In certain preferred embodiments, the spin function is a frequency-modulated or an amplitude-modulated sinusoidal function, the modulation being sufficient to cause the spin function to not be substantially sinusoidal.

Regardless of which method is used, a spin is imparted onto the optical fiber and the nature of the spin imparted impacts the degree to which PMD is reduced. A spin is "impressed" on the fiber when the fiber in the hot zone and is caused to be torsionally deformed resulting in the deformation being 'frozen' into the fiber as it cools from its molten state. Once cooled, the fiber exhibits a permanent "spin", i.e., a permanent torsional deformation. Importantly, however, the amount of spin that is actually introduced into the molten fiber is not always the same as the amount that is attempted to be introduced. There are various factors effecting the rotational transfer.

For example, FIG. 1 illustrates an aparatus for forming optical fibers. The optical fiber 25 may 'slip' on the rollers imparting the twist 60. Further, the length of fiber span between the molten fiber and the spinning apparatus 60 impacts the degree of cooling and thus the amount of spin actually impacted. The spinning apparatus 60 may comprise a roller 191 or other means to provide spin and imparts an angular movement $\theta_1$ 55 to the fiber. However, the spinning apparatus 60 is located at a distance from the heating apparatus 15 such that the fiber has cooled down somewhat by the time the coating is applied and further cooled once it comes into contact with the spinning apparatus. Thus, while the spinning apparatus imparts an angular movement $\theta_1$ 55 at a lower point, a different angular movement, $\theta_2$ 28, is imparted near the neck-down region 20 with the value of $\theta_1 < \theta_2$ This is due in part to:

1. the long span of fiber between the neck-down region and the spinning apparatus;
2. the viscous drag characteristics of the coating;
3. the viscous drag characteristic of the neck-down itself;
4. slippage of the fiber in spinning apparatus; and
5. temperature differential of the fiber along its length.

Consequently, the spin actually introduced compared to the spin attempted to be introduced is less than 100% but closely correlates with the spin attempted to be introduced.

In addition to "spin", another metric regarding optical fibers that is measured during the manufacture is "twist". The spin and twist metrics are related, and the terms are sometimes used interchangeably in the prior art. Sometimes, in the prior art there is no distinction between these words, or the differences are based on context, which may create confusion. As used herein, "spin" refers to the rotation introduced into the optical fiber in the molten state (i.e., prior to cooling), whereas "twist" refers to rotation introduced onto the optical fiber after it has cooled. Spin is imparted into the molten fiber, and is permanently fixed when the fiber has cooled. Twist refers to the mechanical rotational force imposed on the optical fiber after it has cooled and can be altered. Twist in the optical fiber typically occurs due to the spin process and, unlike spin, twist typically introduces torsional stresses on the fiber because it is introduced after the fiber has cooled and becomes relatively inelastic compared to its molten state. Twist can be "undone" or reduced by applying a rotational force in the other direction, whereas spin is permanent. Extreme amounts of twist can cause microscopic cracks, and contribute or cause the ultimate physical destruction of the fiber. Consequently, it is desirable to reduce or eliminate twist introduced on the fiber.

Hart recognizes that twist can occur and identifies one method of reducing twist on a optical fiber. Hart discloses "respooling" the fiber by unwinding it and rewinding the fiber, but this method of correcting twist is time consuming and labor intensive. It would be preferable to avoid or minimize the introduction of twist to acceptable levels during manufacturing and avoid additional handling or processing to reduce twist after manufacturing. Hart also discloses the use of a pure sinusoid spin function resulting in substantially equal and opposite twists being introduced onto the fiber for a given cycle, producing a net twist of zero. However, Henderson also discloses a variable spin function that is more effective in reducing PMD than a purely sinuisoidal spin function, but does not address methods for minimizing twist. The selection of one spin function (Hart) minimizes twist, while selection of the other function (Henderson) minimizes PMD.

Therefore, there is a need for a spin function that minimizes PMD while at the same time minimizes twist introduced into the fiber.

SUMMARY OF THE INVENTION

It is an object of the invention to provide an optical fiber having longitudinal axis and a spin which is observable in the fiber imparted by a spin function such that the spin function imparting the spin: (i) has sufficient variability to provide a reduction of polarization mode dispersion for a plurality of beat lengths; and (ii) will result in no net rotations between points at which said variability of said spin function occurs.

It is another object of the invention to provide an optical fiber having a longitudinal axis and a spin which is observable in the fiber wherein said spin was produced by a spin function which for at least a portion of the fiber varies as a function of distance along said axis such that said spin function is a modulated sinusoidal function wherein said modulated sinusoidal function has zero net turns over an interval corresponding to a whole number of cycles of said modulated sinusoidal function.

It is another object of the invention to provide a method of manufacturing optical fiber comprising drawing an optical fiber from a preform, imparting a spin on the optical fiber from a spinning apparatus wherein the spinning apparatus uses a spinning function which is a modulated sinusoidal function wherein said modulated sinusoidal function produces a net rotation of zero over an interval corresponding to a whole number of cycles of said frequency modulated sinusoidal function.

BRIEF DESCRIPTION OF THE DRAWINGS

FIGS. 2A–2B depict a prior art spin apparatus for use in the optic fiber manufacturing apparatus of FIG. 1, which introduces spin into the optical fiber manufacturing with and without a cant.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As faster and faster transmission speeds are used to convey information using optical fiber, the quality of the optical fiber becomes more critical. Various imperfections that were insignificant at low transmission speeds, can become significant factors effecting higher transmission speeds. One such imperfection is a type of distortion called Polarization Mode Dispersion (PMD). As discussed above, it is well known that single mode fiber actually contains two polarization states of the fundamental mode. These states are orthogonal to each other, and have the characteristic that they can travel at different rates. Ideally, each mode travels at identical rates, but imperfections in the optic fiber can lead to birefringence, i.e., the relative propagation delay between the two polarization states.

Figure 1:
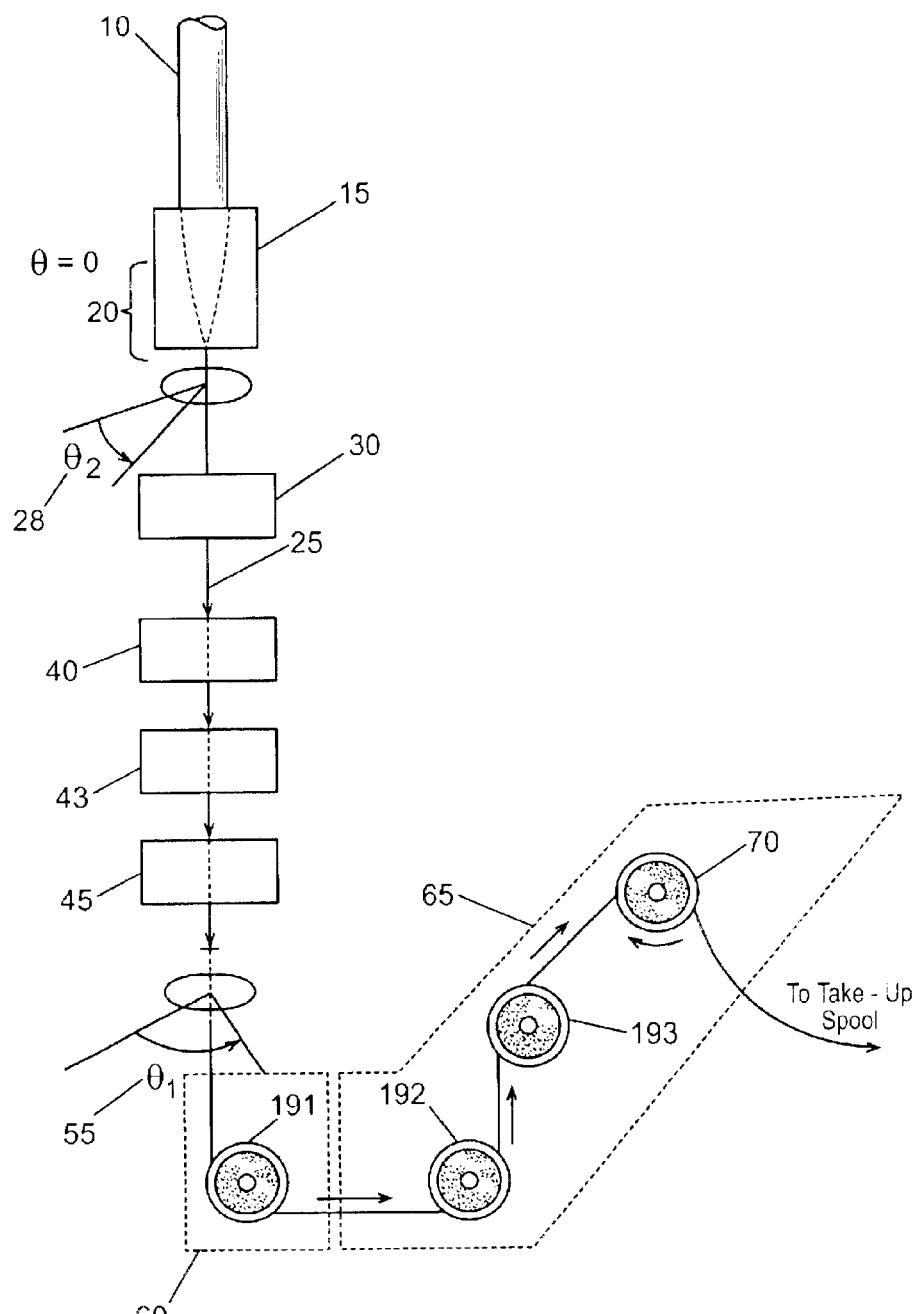
FIG. 1 depicts an apparatus for drawing optical fiber during manufacturing.

A well known method of reducing PMD is to rotate or spin the optical fiber as it is being formed. FIG. 1 illustrates an exemplary fiber optic apparatus. A preform 10 of pure glass is previously formed to provide the material for the optical fiber. The preform is heated by a heat source 15 using conventional means. Once the preform is heated to its melting point and a fiber has been pulled, an angular area called the neck-down 20 is formed. A single optical fiber 25 emerges from the preform in a semi-molten state and passes through a diameter monitor 30. The optical fiber continues to be pulled downward and passes through a coating applicator 40 that applies a coating to protect the optical fiber. The fiber may also pass through other units that cure the optical coating 43, and monitor the overall diameter 45 after the coating has been applied. The optical fiber 25 than encounters a spinning apparatus 60 which may comprise a roller 191 that imparts a spin into the fiber. Such spinning apparatus have been described in previous patents and may incorporate rollers or take-up wheels (see, for example, U.S. Pat. No. 5,298,047). The optical fiber 25 then eventually encounters a series of rollers 65 pulling the fiber. The fiber is then wrapped around a spool (not shown).

FIG. 2 illustrates the rollers 60, 65 in FIG. 1 greater detail from another perspective in which roller 191 of the spinning apparatus 60 of FIG. 1 corresponds to roller 291 in FIG. 2, and so on. In FIG. 2A the roller 291 is not imparting any spin on the fiber 25 in this illustration. However, FIG. 2B illustrates roller 291 canted at an angle for imparting a rotation or spin onto the fiber. Roller 291 oscillates back and forth such that the desired amount of twist is introduced. As mentioned previously, the spin imparted is less than the spin that is attempted to be imparted (which is defined by the spin function) based on previously recited factors. Nonetheless, a spin is imparted onto the molten fiber and can be measured using a variety of techniques.

Figure 3A:
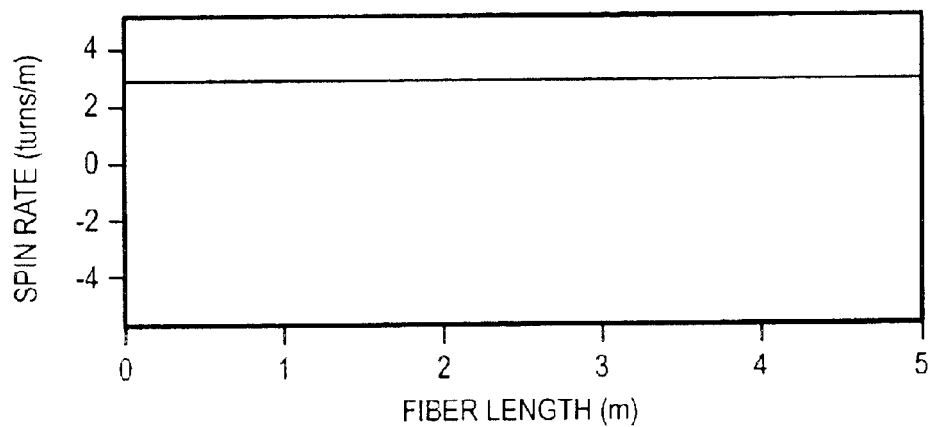
FIG. 3A depicts a uniform, linear spin function used by the prior art spin apparatus of FIGS. 2A–2B.
Figure 3B:
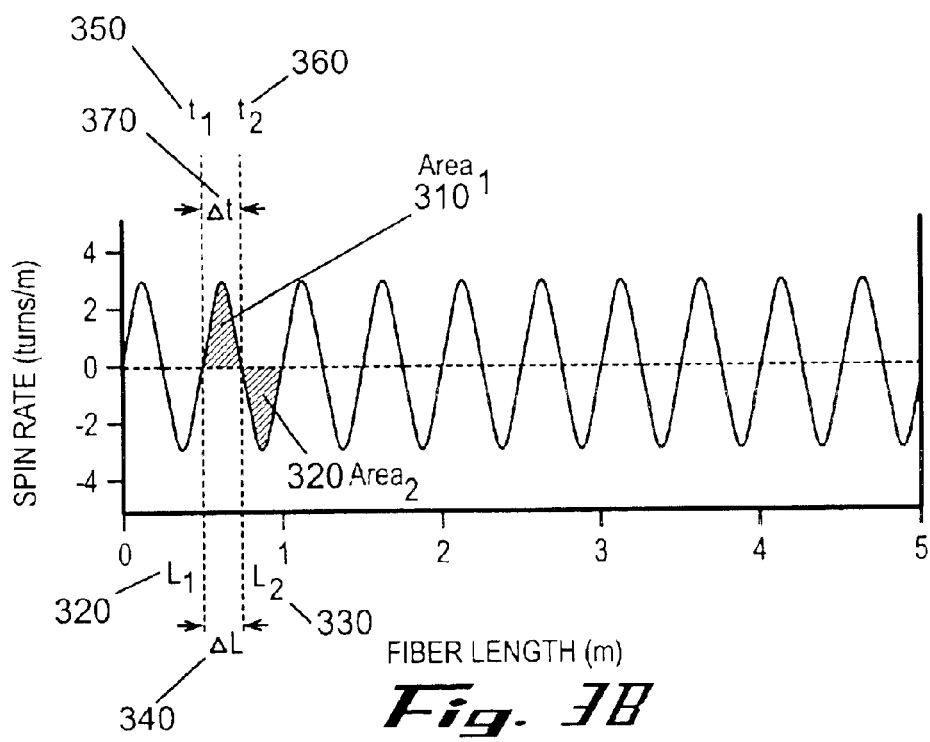
FIG. 3B depicts purely sinusoidal spin function used by the prior art spin apparatus of FIGS. 2A–2B.

The roller 291 can be modulated using different spin functions that impart different magnitudes into the optical fiber. Some conventional spin functions are illustrated using the charts in FIGS. 3A–3B. FIG. 3A illustrates a constant spin function that has a constant spin rate in a single direction over the length of one meter. In this illustration, a constant 3 turns/meter is present over the length of the fiber. In FIG. 3B, a purely sinusoidal spin function is illustrated, in which the spin function varies in a periodic manner according to a sine wave function along the length of the fiber. Positive values indicate a rotation in one direction, and negative values indicate a rotation in the other direction. It is not critical as to which direction is clockwise or counter-clockwise for the positive or negative values, since direction of rotation is relative.

The operation of the spinning apparatus 60 in FIG. 1 is controlled by a processor (not shown) which executes a software algorithm incorporating a spin function. The processor also may control other aspects exemplary fiber optic apparatus of FIG. 1. Such specific aspects include controlling the draw rate by altering the speed of the rollers 65 including the capstan 70, controlling the heat of the heat source 15, as well as receiving diameter measurements from the diameter measurement device 30.

Figure 3C:
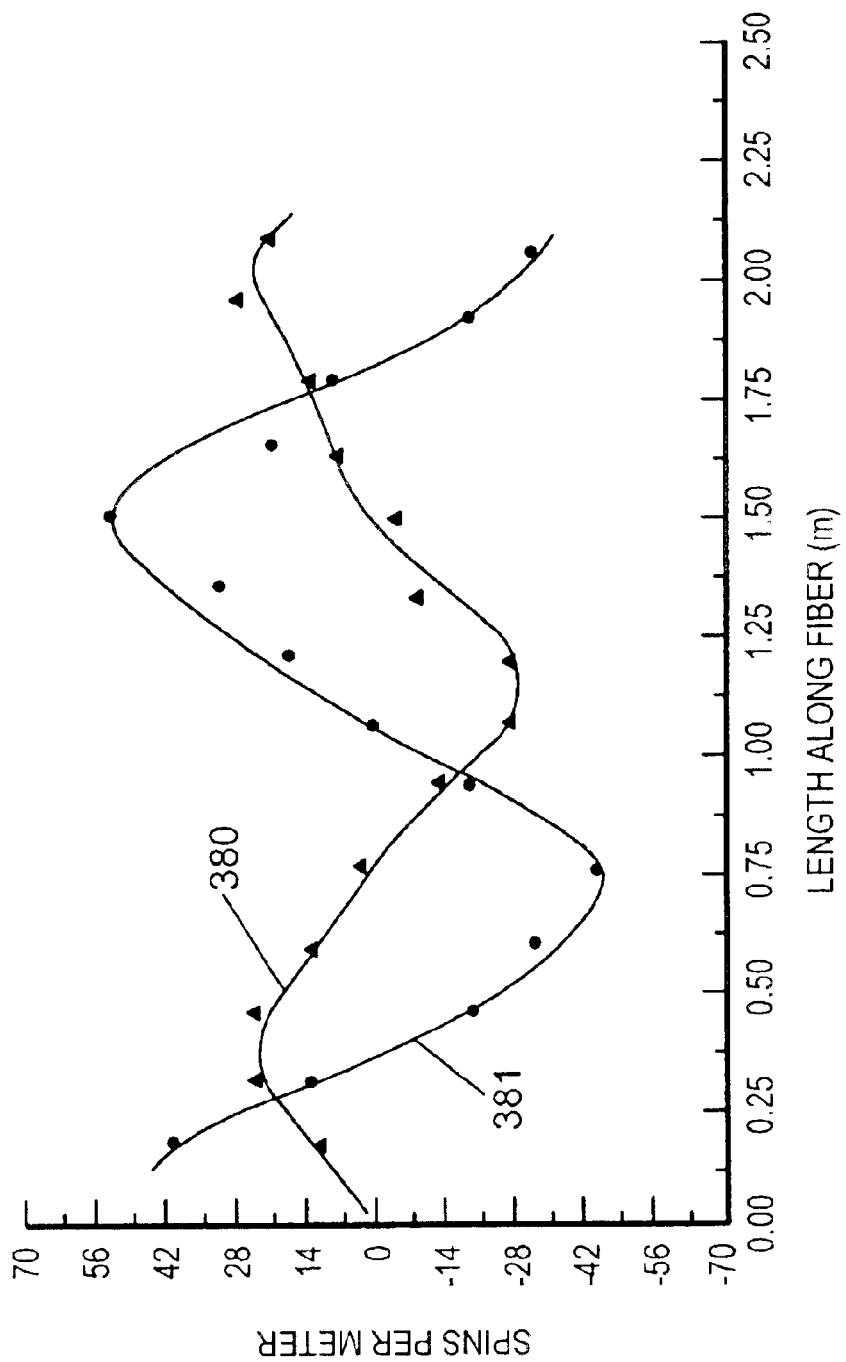
FIG. 3C depicts measurements of spin imparted from a sinusoidal spin function in an optical fiber by the prior art spin apparatus of FIGS. 2A–2B using the purely sinusoidal spin function depicted in FIG. 3B.

As previously mentioned, the actual spin imparted is not equivalent to the spin that is attempted to be imparted. The spin function represents the latter—that which is attempted to be imparted. The Hart patent describes an applied spin function as an oscillation, i.e., a pure sinusoid, at 60 cycles/minute for a draw speed of 1.5 meters/second. Actual spin imparted on a fiber was measured and corresponds to graph 380 of FIG. 3C which is reproduced from Hart's FIG. 6. Similarly, a purely sinusoidal spin function of 106 cycles/minute for a draw speed of 3.0 meters/second results in a measured imparted spin function depicted in graph 381 of FIG. 3C. However, for purposes of illustrating the present invention, the focus is on the spin function of the spinning apparatus, and it is recognized that the actual imparted spin function may be slightly different. Consequently, examining the spin imparted in a fiber will be slightly different than the spin function. Thus, while a spin function may have zero net turns over a period corresponding to a whole number of cycles, the actual spin imparted on a fiber using this function over the corresponding interval may have a small net number of turns (i.e., a non-zero value). This slight difference is expected, and it should not be concluded that such fiber was manufactured with a spin function that did not incorporate the principles of the present invention.

Returning to FIG. 3B, the draw rate of the optical fiber is presumed constant and the length of the fiber represented on the X axis is directly proportional to time. Thus, selecting a length of the fiber of FIG. 3B bounded by $L_1$ 320 and $L_2$ 330 resulting in a length of $\Delta L$ 340 correlates to $T_1$ 350 and $T_2$ 360 which can be represented as $\Delta T$ 370. During this interval (either viewed as a time period or length of fiber), $Area_1$ 310 is bounded by the line representing the spin function and a line representing a zero spin rate. Further, $Area_1$ 310 can be expressed as the integral of the spin function between $L_1$ and $L_2$. The area represents "(turns/meter)* meter" and is the number of turns or rotations imparted in the fiber during the interval. Since the spin function disclosed is periodic and of the same amplitude, it follows that the $Area_1$ 310 and $Area_2$ 320 are equal in area, but represent rotations in opposite directions. Summing $Area_1$ 310 and $Area_2$ 320 produces a net result of zero, meaning the net turns is equal to zero, which corresponds to a zero net twist imparted onto the fiber. Thus, a purely sinusoidal spin function results in no net twist on a fiber. This can be expressed in the following equation as integrating the spin function over one or more cycles with a result of zero:

$$\int_{z_n}^{z_n+T_n(z)} \alpha(z)dz = 0$$

Where α(z) describes some spin function as a function of length, z, along the fiber, $z_n$ is the start of the nth cycle of the spin function, and $T_n(z)$ is the length of the nth cycle which could be a function of length along the fiber.

While it is true that there may be a net twist on a given section of fiber within a cycle, the net twist will return to zero at the end of the cycle. The result is that there is no net incremental twist introduced on the fiber, and the twist on the fiber for a length corresponding to X cycles should be no greater than the maximum twist in a single cycle.

Figure 4:
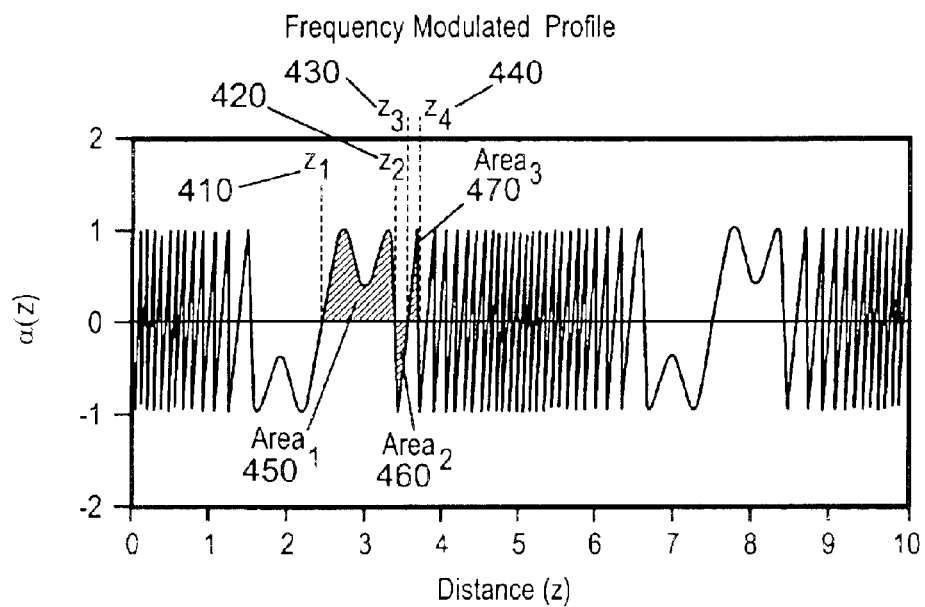
FIG. 4 depicts another spin function that is variable in frequency prior in the prior art.

However, as noted by Henderson, a purely sinusoidal spin function or a substantially sinusoidal spin function does not optimize the reduction of PMD. Henderson discloses a variable spin function that effectively further decreases PMD. Henderson discloses that sufficient variability, e.g. having sufficient harmonic content to the spin function, provides a substantial reduction in PMD. Henderson further discloses that both frequency and amplitude modulation can be performed if desired, but that in so doing, care must be taken that the two modulations do not interact so as to create sections of fiber in which the spin rate is essentially constant (and thus not providing sufficient harmonic content). Accordingly, Henderson discloses the preferred use as modulating the amplitude or frequency separately, as opposed to simultaneously, for the purpose of ensuring sufficient harmonic content, not for the purpose of avoiding twist. One example of a spin function having sufficient harmonic content in Henderson is the spin function disclosed in FIG. 4 reproduced from Henderson. This spin function has a constant amplitude, but the frequency varies at various points along the distance of the fiber, D(z).

However, Henderson does not discuss or recognize the need to avoid twist in the fiber. Henderson teaches away from a spin function that results in a net twist of zero by altering the frequency in the middle of a cycle, as evidenced by examining FIG. 4, which discloses a variable frequency modulated spin function. Specifically, noting the distance between $Z_1$ 410 and $Z_3$ 430, which represents a 'cycle', it is observed that the integration of the area bounded by the curve and the zero axis is not zero. The area of Area$_1$ 450 when added with Area$_2$ 460 is not zero. Unlike a purely sinusoidal spin functions, the integration of this function over a cycle does not result in a zero value. In other words, the spin function produces a net spin resulting in a net twist introduced to the fiber. Alternatively, if the "cycle" is defined as $Z_2$ 420 and $Z_4$ 440, involving areas Area$_2$ 460 and Area$_3$ 470, then since the frequency is depicted as gradually increasing, and Area$_2$ 460 must be greater than Area$_3$ 470. Thus, the sum of Area$_2$ 460 and Area$_3$ 470 must be non-zero and a positive net twist is introduced between $Z_2$ 420 and $Z_4$ 440.

It is possible to define a variable spin function in which no net twist is produced. Such a spin function has the characteristic of altering the frequency or amplitude, or both, but with the provision that the alteration occurs at the beginning/end of a cycle. In other words, the spin function is keyed to a particular cycle(s), specifically the beginning/end of a cycle. Altering the frequency/amplitude during a cycle, as illustrated by Henderson, is to be avoided since it may result in a net twist.

Figure 5A:
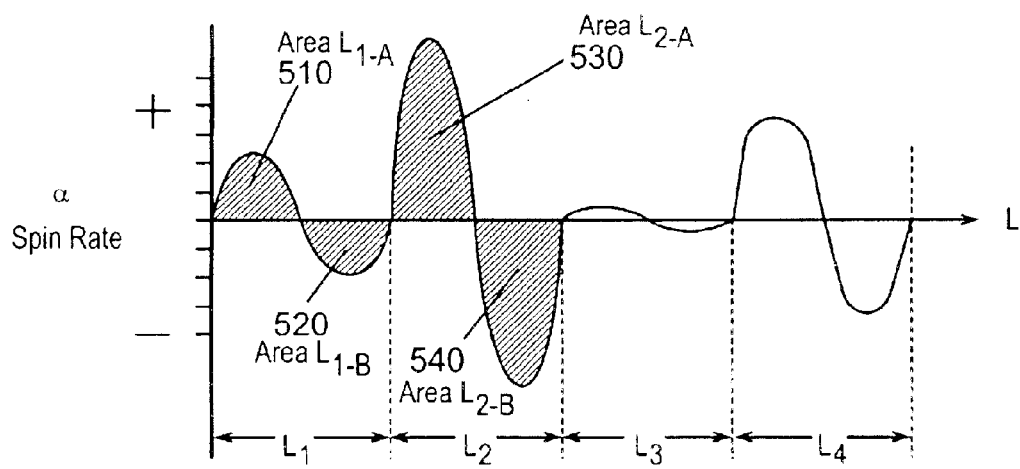
FIG. 5A depicts a variable amplitude spin function used to spin an optical fiber with reduced twist according to one embodiment of the present invention.

This can be illustrated using FIG. 5A depicting a variable amplitude spin function. In this embodiment of the invention, a spin function with constant frequency is shown. Specifically, the interval of length of fiber for any cycle, illustrated as $L_1$, $L_2$, $L_3$, $L_4$, et cetera, is equal to the length of fiber for another cycle, but the amplitude of the spin function is varied. During $L_1$, the positive amplitude is equal to the negative amplitude. Since the area bounded by the curve Area$_{L1-a}$ 510 and Area$_{L1-b}$ 520 are the same, the number of rotations imparted in the fiber in these two areas are the same, but in opposite directions. Therefore, the net twist introduced on the fiber during $L_1$ is zero. Similarly, Area$_{L2-a}$ 530 and Area$_{L2-b}$ 540 are the same and the net twist introduced during $L_2$ is zero as well. Therefore, if the interval of $L_1+L_2$ is considered, the net twist is also zero. By extending the analysis to other periods, it becomes evident that the net twist during any cycle time is zero, and the net twist over any whole number of time cycles is also zero. Thus, a variable amplitude spin function is defined that provides the benefit of increased PMD reduction disclosed in Henderson with the avoidance of introduced twist as disclosed in Hart.

In the above discussion, the areas under the curves are discussed as being the same area and their summations as being zero. It is understood that in actual application, there will be some variance in the values, such that the areas are substantially equal and their summation is substantially zero within accepted tolerances.

Figure 5B:
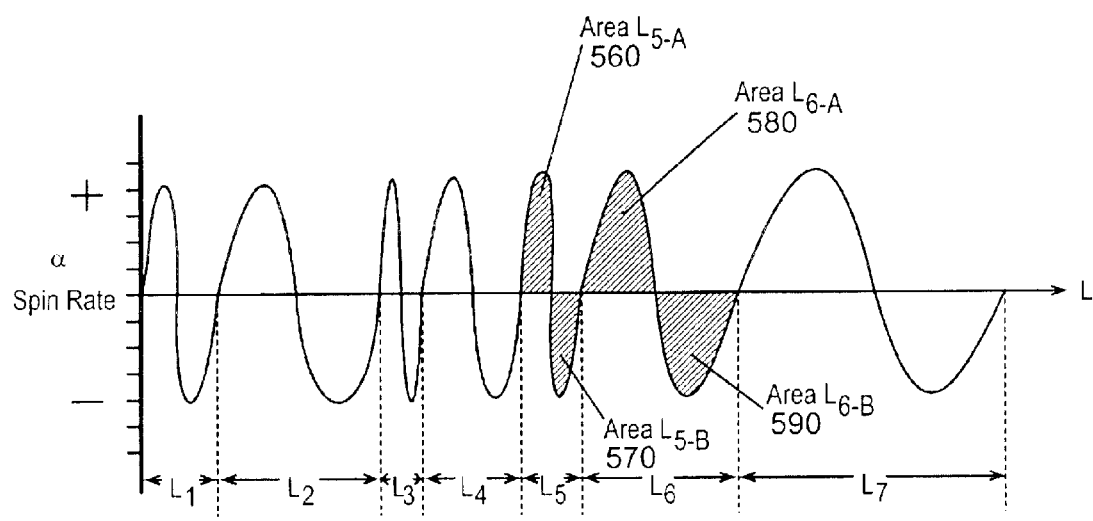
FIG. 5B depicts a variable frequency spin function used to spin an optical fiber with reduced twist according to one embodiment of the principles of the present invention.

FIG. 5B illustrates another embodiment of the present invention illustrating a variable frequency spin function, but having a constant amplitude spin function. The cycles are indicated at $L_1$, $L_2$, $L_3$, $L_4$, et cetera. The cycles are unequal intervals, but the spin for each cycles is the same amplitude. Similar to the analysis of FIG. 5A, the areas bounded by the curves represent the number of spins imparted during that interval. Specifically, the area bounded by Area$_{L5-a}$ 560 and Area$_{L5-b}$ 570 represents the number of spins during that interval ($L_5$). Since the sum of the areas of Area$_{L5-a}$ 560 and Area$_{L5-b}$ 570 is zero, the net rotations introduced on the fiber during $L_5$ is zero and therefor results in a net twist of zero over $L_5$. Similarly, the net spin and twist introduced during $L_6$ is also zero, and the combination net twist and spin over the intervals $L_5$ and $L_6$ in FIG. 5B must also be zero.

Figure 6:
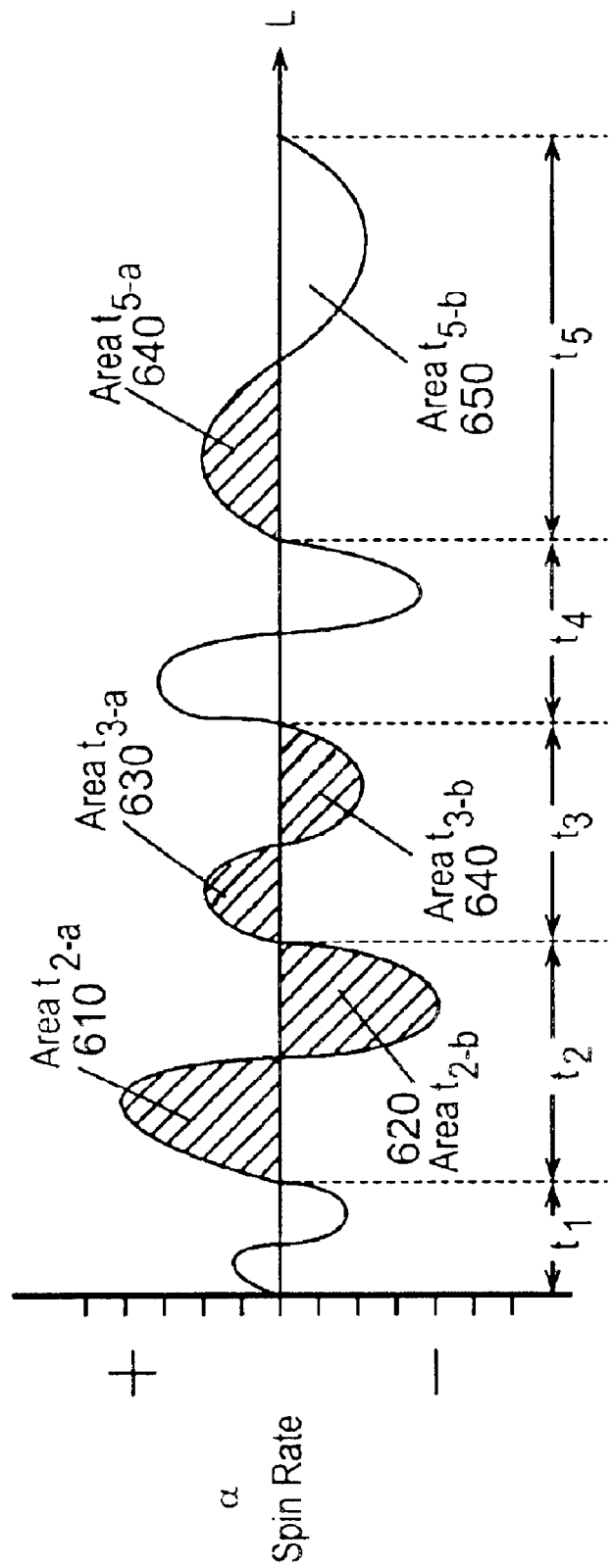
FIG. 6 depicts a combination variable amplitude and variable frequency spin function used to spin an optical fiber with reduced twist according to one embodiment of the present invention.

It is possible to illustrate the principles of the present invention by varying both the amplitude and the frequency for achieving ultra-low PMD levels while still maintaining a net twist of zero. This is illustrated in FIG. 6 in which the X axis represents time. FIG. 6 illustrates intervals which are equal, such as $t_2$ and $t_3$, but in which the amplitudes are different. Similarly, FIG. 6 illustrates intervals in which the amplitudes of the spin function are equal, such as $t_3$ and $t_5$, but in which the frequencies are different. However, examining any particular cycle illustrates that the integration of the function over that cycle is zero. For example, for $t_2$ the area bounded by Area$_{t2-a}$ 610 and Area$_{t2-b}$ 620 sums to zero. This is because the spins imparted in Area$_{t2-a}$ 610 is equal, but in opposite direction, than in Area$_{t2-b}$ 620. Thus, the net spin and the net twist imparted is zero. The analysis for at $t_1$, $t_3$, $t_4$, et cetera produces the same result. Examining consecutive time periods, e.g., $t_3+t_4+t_5$, produces a net spin and twist of zero as well. Again, a variable spin function for achieving ultra-low PMD levels is obtained without resulting in twist introduced into the fiber optic cable.

The variation of the amplitude, frequency, or combination of the two can be determined in a variety of ways. To generate a suitable degree of variable spin in an optic fiber using the above spin functions, the sequence of amplitude or frequency values may be chosen from some type of random distribution (i.e., uniform, normal, etc.) or some other function, such as a linear function. It is possible that a spin function corresponding to an arbitrary fixed length of fiber draw may be generated offline and used to generate the motion commands for a fiber spinning device. This fixed length sequence may be used sequentially along the fiber, given that its length is long enough to cover a substantial length of the fiber (i.e., 500 meters). It is also possible to generate a random sequence during the course of operation of the fiber spinning device to provide a greater degree of variability to the values that are generated, which would reduce any possibility of repetition of the sequence. It would be further possible to pre-generate a sequence that would cover any length of fiber, without any significant limitation on the amount of variability of the spin function.

Various types of spinning mechanisms discussed in Hart or other mechanisms now known or subsequently developed in the art, can be used in the practice of the invention. See, for example, U.S. Pat. No. 4,509,968, to Arditty et al., which describes apparatus for rotating a fiber about its axis as it is being formed. In general terms, the spinning apparatus, however constructed, will include fiber-contacting means for applying a spinning force to a fiber, e.g., a roller, and drive means for moving the fiber-contacting means in a non-sinusoidal spatial pattern as a function of time, e.g., a computer-controlled drive motor and associated mechanical linkage for defining the motion of the fiber-contacting means.

Additional mechanisms for practicing the methods of the invention will be evident to persons skilled in the art from the disclosure herein. For example, it would be possible to practice the invention by using mechanisms for non-sinusoidal spinning of a preform, when such preform spinning is used alone or in combination with applying a spinning force to a fiber.

As example, the spinning functions of the present invention can be implemented in the spinning apparatus 60 illustrated in FIGS. 1, 2A, and 2B. In this instance, the roller 191 can be controlled such that its oscillations follow one of the spin functions. For example, in one embodiment, the systems and methods of the present invention control the spinning apparatus to spin the optical fiber using a variable amplitude spin similar to that depicted in FIG. 5A or a variable frequency spin similar to that depicted in FIG. 5B. Further, in some embodiments, the systems and methods of the present invention may control the spinning apparatus to spin the optical fiber that varies in both amplitude and frequency as depicted in FIG. 6. The actual spin imparted into a fiber, while not exactly identical as the spin function, can be measured. The existence of the imparted spin can be readily ascertained, e.g., by microscopic examination of bubbles in the fiber to determine rotation of core ovality or eccentricity, or by means of a traveling magneto-optic modulator, as used by M. J. Marrone et al., Optics Letters, Vol. 12(1), p. 60.

The foregoing sets forth improved methods and apparatus for reducing PMD. Although particular illustrative embodiments have been disclosed, persons skilled in the art will appreciate that the present invention can be practiced by other than the disclosed embodiments, which are presented for purposes of illustration, and not of limitation, and the present invention is limited only by the claims that follow.

We claim:

1. A method of manufacturing optical fiber comprising:
    drawing an optical fiber from a preform; and
    imparting an observable spin on the optical fiber using a spinning motion having amplitude and frequency parameters that are defined by a modulated sinusoidal function, wherein the value of at least one of the parameters is altered for a given period of the function and the alteration occurs at the beginning of the period.

2. The method of claim 1 wherein the modulated sinusoidal function is an amplitude modulated sinusoidal function, and wherein said imparting step imparts a spin on the optical fiber using a spinning motion that is sinusoidal and varies in amplitude for different periods of the function.

3. The method of claim 1 wherein the modulated sinusoidal function is a frequency modulated sinusoidal function, and wherein said imparting step imparts a spin on the optical fiber using a spinning motion that is sinusoidal and varies in frequency for different periods of the function.

4. The method of claim 1 wherein the modulated sinusoidal function is a modulated sinusoidal function, and wherein said imparting step imparts a spin on the optical fiber using a spinning motion that is sinusoidal and varies in amplitude and frequency for different periods of the function.

5. The method of claim 1 wherein said imparting method uses a spinning motion defined by a modulated sinusoidal function, wherein the value of at least one of the parameters is altered from period to period of the function by a random manner.

6. The method of claim 1 wherein said imparting method uses a spinning motion defined by a modulated sinusoidal function, wherein the value of at least one of the parameters is altered from period to period of the function in a linear manner.

7. An optical fiber formed from glass material, wherein said glass material is spun as it is drawn into said optical fiber and has an observable spin pattern that is substantially defined by a modulated sinusoidal function having amplitude and frequency parameters, wherein the value of at least one of the parameters is altered for a given period of the function and the alteration occurs at the beginning of the period.

8. The optical fiber of claim 7 wherein said spin pattern of said glass material is substantially defined by an amplitude modulated sinusoidal function that varies in amplitude for different periods of the function.

9. The optical fiber of claim 7 wherein said spin pattern of said glass material is substantially defined by a frequency modulated sinusoidal function that varies in frequency for different periods of the function.

10. The optical fiber of claim 7 wherein said spin pattern of said glass material is substantially defined by a frequency and amplitude modulated sinusoidal function that varies in both amplitude and frequency for different periods of the function.

11. The optical fiber of claim 7 wherein said spin pattern of said glass material is substantially defined by a modulated sinusoidal function, wherein the value of at least one of the parameters of the function is altered from period to period of the function by a random manner.

12. The optical fiber of claim 7 wherein said spin pattern of said glass material is substantially defined by a modulated sinusoidal function, wherein the value of at least one of the parameters of the function is altered from period to period of the function in a linear manner.

13. A system of manufacturing an optical fiber comprising:
    a preform from which an optical fiber is drawn;
    a spinning apparatus wherein the spinning apparatus imparts a spin on said optical fiber as it is drawn;
    a processor wherein said processor controls the spinning apparatus using a spin function wherein said spin function is a modulated sinusoidal function with no net turns over a whole number of cycles of said sinusoidal function.

14. The system of manufacturing an optical fiber of claim 13 wherein said modulated sinusoidal function is an amplitude modulated sinusoidal function where the modulation is altered at the beginning of a cycle.

15. The system of manufacturing an optical fiber of claim 13 wherein said modulated sinusoidal function is a frequency modulated sinusoidal function where the modulation is altered at the beginning of a cycle.

16. The system of manufacturing an optical fiber of claim 13 wherein said modulated sinusoidal function is an amplitude and frequency modulated sinusoidal function where the modulation is altered at the beginning of a cycle.

* * * * *